United States Patent [19]
Bieri

[11] Patent Number: 6,042,168
[45] Date of Patent: Mar. 28, 2000

[54] STORAGE DEVICE FOR THE PASSENGER COMPARTMENT OF A VEHICLE

[75] Inventor: Frédéric Bieri, Bucheres, France

[73] Assignee: Plastic Omnium Auto Interierur, Lyons, France

[21] Appl. No.: 09/038,734

[22] Filed: Mar. 11, 1998

[30] Foreign Application Priority Data

Mar. 12, 1997 [FR] France .................................. 97 03225

[51] Int. Cl.$^7$ ...................................................... B60N 3/12
[52] U.S. Cl. ........................ 296/37.12; 224/281; 224/483; 312/246; 312/323
[58] Field of Search .................. 296/37.8, 37.1, 296/37.12; 224/281, 282, 483; 312/322, 323, 334.16, 334.45, 246; 108/6, 93, 143

[56] References Cited

U.S. PATENT DOCUMENTS

| | | | |
|---|---|---|---|
| 614,666 | 11/1898 | Petry | 312/323 X |
| 2,695,831 | 11/1954 | Sigal | 312/246 |
| 3,519,319 | 7/1970 | Taylor | 312/246 |
| 4,138,176 | 2/1979 | Cowdroy | 312/334.16 |
| 4,368,866 | 1/1983 | Urban | 312/323 X |
| 5,306,077 | 4/1994 | Trevaskis | 312/323 X |
| 5,393,137 | 2/1995 | Bivens et al. | 312/334.16 X |

FOREIGN PATENT DOCUMENTS 406144118  5/1994  Japan ..................................... 224/483

*Primary Examiner*—D. Glenn Dayoan
*Assistant Examiner*—Chad D Wells
*Attorney, Agent, or Firm*—Harrison & Egbert

[57] ABSTRACT

Storage device for the interior passenger compartment of a vehicle, particularly of an automobile, including a container (1) which acts together with a seating area (2) provided in a component (3) of the casing and/or of the interior equipment of the vehicle. The aforementioned seating area (2) has a given orientation (7).

The aforementioned container (1) and the aforementioned seating area (2) have, at the level of their lateral sides (4, 5), supplemental guide mechanisms (6) which make possible the movement of the container (1) into the seating area (2) according to the orientation (7).

7 Claims, 2 Drawing Sheets

STORAGE DEVICE FOR THE PASSENGER COMPARTMENT OF A VEHICLE

TECHNICAL FIELD

The invention presented here relates to a storage device for the interior passenger compartment of a vehicle, particularly of an automobile.

BACKGROUND ART

Different types of devices allowing for the storage of objects inside the passenger compartment of a vehicle are currently known. These involve, for example, seat trays. The advantage of seat trays is that they allow for directly accessing their contents.

However, it is sometimes necessary to hold and/or conceal the stored objects, and in order to do this, devices have been developed, known as glove boxes, which consist of a storage space closed by a cover. To make them easier to use, the container of these glove boxes is sometimes made to fold down in order to allow its extraction/retraction.

Nevertheless, none of these devices can be raised satisfactorily. Such is the case notably when the available storage space has a large area but is low in height. In fact, using the devices described above, the access to the stored objects is thus only possible by their edge, which leads to problems.

The purpose of the invention presented here is to propose a storage device for the interior passenger compartment of a vehicle which compensates for the aforementioned disadvantages and makes it easier to access the stored objects.

Another purpose of the invention presented here is to propose a storage device for the interior passenger compartment of a vehicle which makes it possible to occupy spaces of low height.

Another purpose of the invention presented here is to propose a storage device for the interior passenger compartment of a vehicle which can change directional orientation between its closed position and its open position.

Another purpose of the invention presented here is to propose a storage device for the interior passenger compartment of a vehicle for which installation and manipulation are simplified.

Another purpose of the invention presented here is to propose a storage device for the interior passenger compartment of a vehicle which makes it possible to avoid accidental openings.

Another purpose of the invention presented here is to propose a storage device for the interior passenger compartment of a vehicle which can compensate for the vibrations it is subjected to, specifically during travel.

Another purpose of the invention presented here is to propose a storage device which can be dismantled, i.e. it has a container which can be completely removed from the seating area where it is usually housed.

Another purpose of the invention presented here is to propose a storage device which makes it possible to accommodate objects designed to stay in the vehicle permanently.

Another purpose of the invention presented here is to propose a storage device which can be completely freely adjusted inside its container.

Other purposes and advantages of the invention presented here appear in the course of the following description which is only given as a guideline and is in no way intended to limit the invention.

SUMMARY OF THE INVENTION

The invention presented here involves a storage device for the interior passenger compartment of a vehicle, particularly of an automobile, including of a container which acts together with a seating area provided in a component of the casing and/or of the interior equipment of the vehicle, the aforementioned seating area being oriented in a given manner, characterized by the fact that the container and the seating area have, at the level of their lateral sides, supplemental guide mechanisms which make possible the movement of the container into the seating area according to the aforementioned orientation.

BRIEF DESCRIPTION OF THE DRAWINGS

The invention is better understood in reading the following description accompanied by the attached drawings which form an integral part of it, and among which.

DETAILED DESCRIPTION OF THE INVENTION

The invention presented here involves a storage device for the interior passenger compartment of a vehicle, particularly of an automobile.

However, though it is most particularly planned for applications of this sort, it can also be used in any other type of nautical, air, or land vehicle.

Figure 1:
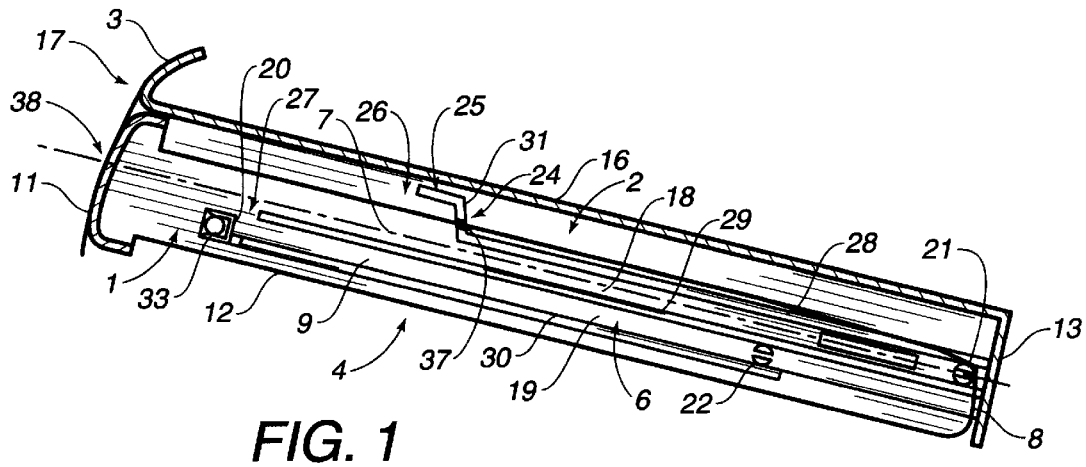
FIG. 1 is a side view showing, in a section, an embodiment of the storage device according to the invention, in the closed position, FIG. 2 includes, according to the same view, the storage device shown in FIG. 1, in the open position.

As shown in FIG. 1, the storage device for the interior passenger compartment of a vehicle according to the invention include of a container 1 shown in dotted lines, acting together with a seating area 2, planned in a casing and/or interior equipment component 3 of the of the vehicle. This can involve, for example, a dashboard.

According to a first embodiment mode, the seating area 2 has a volume which is roughly the same as the space requirement of the container 1.

According to another embodiment mode, the seating area 2 can be a larger size in a manner so as to make it possible to accommodate, in addition, specifically below the container 1, another storage device, possibly suited to be taken off outside the vehicle.

In this case, the container 1 of the device according to the invention is designed, on the other hand, for example, to stay permanently in a manner so as to make it possible to accommodate the objects which one wishes to permanently keep in the vehicle such as, specifically, the manufacturer's booklets, roadmaps, accident report forms, etc.

Since the residual storage space planned for this purpose might be low in height but with a large area, it is thus necessary to make it easier to access the stored products.

In order to do this, according to the invention, the container 1 and the seating area 2 have, at the level of their lateral sides 4, 5, supplemental guide mechanisms 6 making it possible to move the container 1 into the seating area 2 according to the orientation 7 of the seating area.

As a remark, it is noted that due to the complete integration of the guide mechanisms 6 at the level of the lateral sides 4, 5, the shape of the container 1 is thus open. It can thus have, for example, a simple profile which makes its manufacture easier and allows complete freedom of interior adjustment.

Moreover, specifically in the case where, as mentioned above, the vehicle is also equipped below the container 1 with a second completely extractable storage device and in the possibility that the second completely extractable storage device will not be permanent, the integration of the guide mechanisms 6 at the level of the lateral sides 4, 5 of the storage device according to the invention makes it possible, in addition, to ensure effective guidance even in these conditions.

According to the particular embodiment mode shown, the container 1 and/or seating area 2 have a roughly parallelepiped form. The container thus has, notably, a bottom 8, lateral sides 9, 10, a front 11 and/or a shelf 12. As for the aforementioned seating area 2, it is made up of, specifically, a bottom wall 13, side walls 14, 15, an upper wall 16 and/or a lower wall, not shown, defining specifically an opening 17. As shown, the aforementioned shelf 12 of the container 1 is possibly flat.

In order to avoid the accidental opening of the aforementioned container 1, the orientation 7 of the aforementioned seating area 2 can be, for example, inclined with respect to the horizontal, specifically at an angle of approximately 10°.

When the storage device is in the closed position, the aforementioned container 1 may be completely retracted into the seating area 2.

According to the particular embodiment example shown, the aforementioned guide mechanisms 6 include, on at least one of the sides 4, 5, on the one hand, of two roughly parallel rails 18, 19, which are parallel to the aforementioned orientation 7 of the seating area 2 over at least one part their length. In addition, at least one of the aforementioned two rails 18, 19 has a stop catch 20 at the end of the movement travel.

On the other hand, the guide mechanisms 6 include of two protuberances 21, 22, fitted to be displaced respectively in each of the aforementioned rails 18, 19.

According to the embodiment shown, the two aforementioned rails 18, 19 are planned for each of the sides 4, 5. However, it can be planned to equip one of the aforementioned sides 4, 5 with only one of the rails 18, 19.

Figure 2:
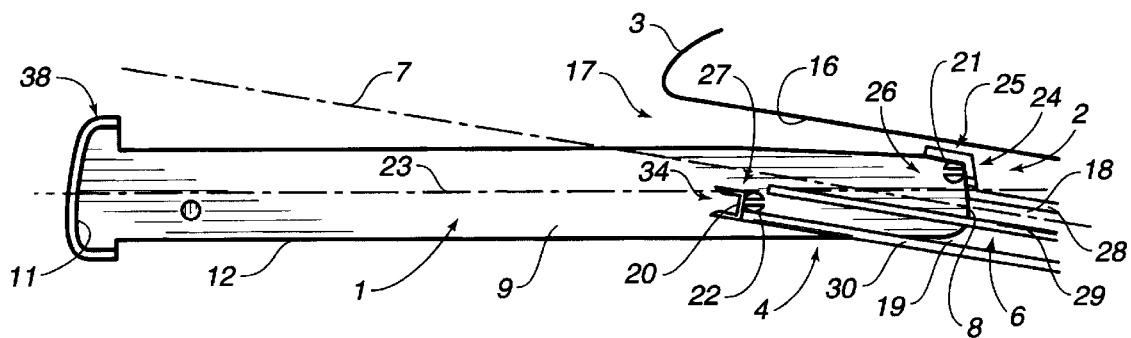

If you refer to FIG. 2, you note that the aforementioned guide mechanisms 6 make it possible, in addition if necessary, to hold the aforementioned container 1 in the open position with reference to the aforementioned seating area 2 in a different direction 23 from that defined by the orientation 7 of the seating area 2.

This may involve, for example, the horizontal direction and/or a direction slightly inclined with respect to the horizontal, toward the inside of the passenger compartment.

A change in direction of this sort allows, specifically, an improved visibility of the objects stored in the container 1 when the container is in the open position.

According to this embodiment, one of the aforementioned rails 18, called the orientation rail, has, at the level of its near end, a portion 24 which diverges with respect to the aforementioned orientation 7 of the seating area 2, ended by a stop 25 at the end of the pivoting travel. The near end is understood to be the end of the rail 18 located across from the opening 17.

Moreover, the protuberance 22 moving in the other rail 19, called the guide rail, is fitted, in addition, to pivot on itself.

As a note: in spite of the terminology used, the rail 18, called the orientation rail, also participates in guidance.

The movement catch stop 20 is located, for example, at the near end of the guide rail 19.

In order to ensure a better support of the container 1 in the open position, the aforementioned protuberances 21, 22 possibly have a clearance spacing given in the aforementioned orientation 7 of the seating area 2.

The pivoting of the aforementioned container 1 is done, for example, when the protuberance 22 moving in the guide rail 19 is supported against the movement catch stop 20.

The pivoting catch stop 25 is planned, specifically, in the aforementioned orientation rail 18 and/or at the level of the upper wall 16 of the seating area 2.

The clearance spacing of the aforementioned protuberances 21, 22 and the placement of the aforementioned movement stop 20 and pivoting stop 25 determine, according to the desired specifications, the position and the orientation of the aforementioned container 1 in the open position.

Particularly in order to make installation easier, the aforementioned container 1 might be completely extractable outside of the aforementioned seating area 2. In order to do this, for example, the openings 26, 27 in the aforementioned rails 18, 19 are planned at the level of the aforementioned catch stops at the end of travel 20, 25.

According to a particular embodiment mode shown, the aforementioned two rails 18, 19 are planned on each of the side walls 14, 15 of the aforementioned seating area 2 and include, on each of the side walls 4, 5, the two 29, 30 or three rods 28, 29, 30, all in parallel and which make up, particularly, the sliding rails.

In order to allow the change in direction, the one rod 28 on the outside of the aforementioned rods has, for example, a pivoting mechanism 31 fitted to allow the path of the corresponding rail, i.e. the orientation rail 18, to diverge with respect to the direction 7 defined by the other rail, i.e. the guide rail 19.

The aforementioned pivoting mechanism 31 consists of, in particular, a portion of the aforementioned outside rod 28 which extends from the middle rod 29.

The aforementioned two protuberances 21, 22 are planned, particularly, on each of the lateral sides 9, 10 of the aforementioned container 1 and include, on each of the aforementioned sides 4, 5, sliding blocks between the aforementioned rods 28, 29, 30.

According to a particular embodiment example, the storage device according to the invention include, in addition, mechanisms 32 for absorbing the vibrations of the container 1. This involves, in specific, mechanisms which allow the compensation of the play existing between the seating area 2 and the aforementioned container 1, and this is done in all directions in space.

The mechanism include, for example, the aforementioned sliding blocks 21, 22, designed to be elastically deformable and having a size slightly larger than the width of the rails 18, 19.

The aforementioned blocks, 21,22 are thus formed, in specific, from two semi-cylinders separated by a slot, the defined diameter of the cylinder being greater than width of the rails 18, 19.

The aforementioned absorbing mechanisms 32 possibly include, in addition, a pin 33 acting together with a guide housing 34 planned at the level of at least one of the sides 4, 5, respectively, on the container 1 and on the seating area 2, or vice-versa. Like the aforementioned blocks 21, 22, the aforementioned pin 33 is planned, for example, to be made from elastic material which can deform and its size is slightly larger than that of the guide housing 34.

The aforementioned pin 33 is, in particular, cylindrical and its diameter is slightly larger than the aforementioned guide housing 34.

The guide housing is located, for example, in the extension of the aforementioned guide rail 19 and/or at the level of the aforementioned movement catch stop 20.

Another interesting aspect of the aforementioned pin 33 and of its guide housing 34 is to mark the closing of the container 1 by performing, in particular, an auto-centering.

Figure 3:
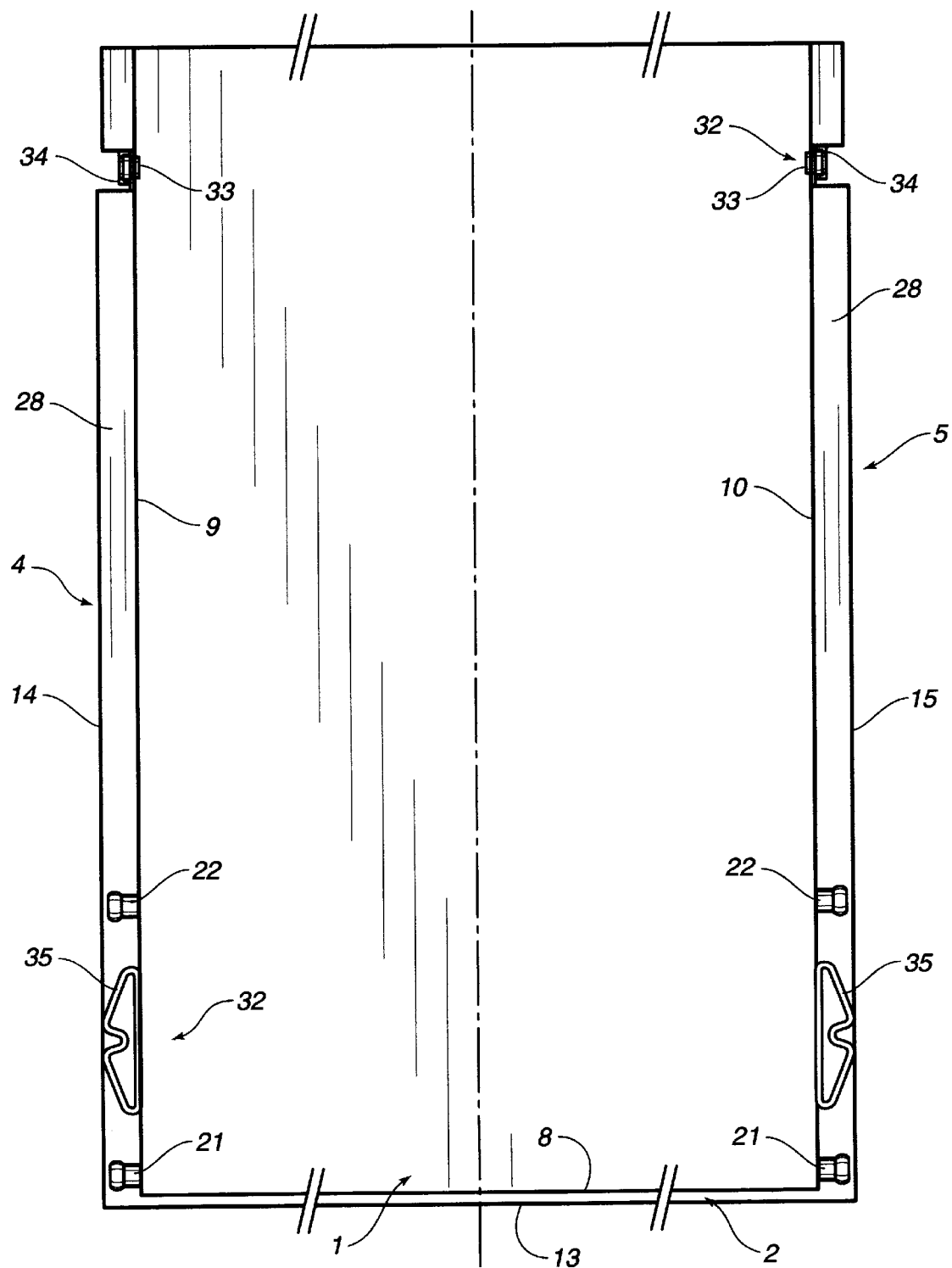
FIG. 3 is a view from above the example of the storage device shown in the above FIG. 1.

With reference to FIG. 3, it is noted that the aforementioned absorbing mechanisms 32 possibly include, in addition, deformable components 35 planned on each of the aforementioned sides 4, 5, on the lateral sides 9, 10 of the container 1 in order to put pressure on the lateral walls 14, 15 of the seating area 2, or vice-versa.

The aforementioned spring leaves 35 are planned, for example, to slide in the aforementioned orientation rail 18.

Figure 4:
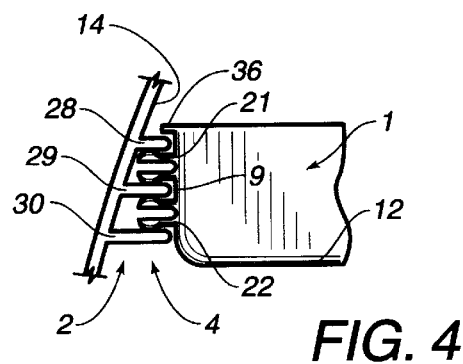
FIG. 4 shows in detail, in a front view, one of the lateral sides of the example of the storage device shown in the above FIG. 1.

As shown in FIG. 4, in order to make sliding easier, the rods 28, 29, 30 might have rounded ends.

According to the specific embodiment example shown, the aforementioned container 1 is equipped with shoulders 36 at the level of the upper edge of its lateral sides 9, 10. The aforementioned shoulders make it possible, specifically, to conceal the rods 28, 29, 30.

In order to make easier the passage of the shoulders 36 at the level of the aforementioned pivoting mechanism 31, the pivoting mechanism might have a slot 37, shown in FIGS. 1 and 2. The aforementioned shoulders 36 thus take part in guidance in a specific way.

Figure 5:
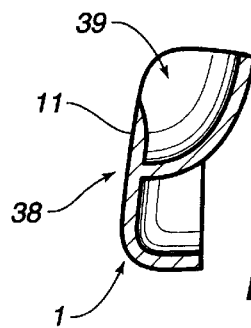
FIG. 5 shows in detail, in a side sectional view, a part of the storage device shown in the above FIG. 1.

If reference is now made to FIG. 5, it is noted that in order to make the manipulation of the aforementioned container 1 easier, the container can have at least one handle 38 on its outer side 11, including in particular of a recess 39 planned in the mass solid and defining a preemption zone.

Of course, other embodiment modes, within the grasp of the expert, could have been imagined without going outside of the frame of the present application.

I claim:

1. A storage device for an interior passenger compartment of a vehicle comprising:
    a seating area having an orientation offset from a horizontal plane, said seating area having lateral sides; and
    a container having lateral sides facing respectively said lateral sides of said seating area; and
    a guide means formed between respective said lateral sides of said seating area and said lateral sides of said container, said guide means for allowing movement of said container within said seating area, said guide means for allowing said container to reside in an open position relative to said seating area in an orientation different than said orientation of said seating area, said guide means comprising:
    an orientation rail extending along and parallel to said orientation of said seating area for at least a portion of a length of said seating area, said orientation rail having a diverging section at a proximal end thereof which diverges from said orientation of said seating area, said orientation rail having a stop formed at an end of said diverging section;
    a guide rail extending along and parallel to said orientation of said seating area for at least a portion of the length of said seating area;
    a first protuberance received within said orientation rail; and
    a second protuberance received within said guide rail, said second protuberance pivotally received in said guide rail when said first protuberance enters an area of said diverging section.

2. The storage device of claim 1, said orientation rail and said guide rail being formed in each of said lateral sides of said seating area, said orientation rail and said guide rail being defined by three rods arranged in parallel relation to each other.

3. The storage device of claim 2, one of said three rods having a pivoting mechanism formed thereon at said diverging section, said diverging section defined by said one of said three rods, said diverging section diverging from an orientation of said guide rail.

4. The storage device of claim 1, said first and second protuberances formed on each of said lateral sides of said container, each of said first and second protuberances being a sliding block positioned between a pair of said three rods.

5. The storage device of claim 1, further comprising:
    a vibration absorbing means positioned between lateral sides of said container and respective lateral sides of said seating area.

6. The storage device of claim 5, said vibration absorbing means comprising:
    a guide housing; and
    a pin cooperatively received by said guide housing, said pin being formed of an elastic material, said pin having a size larger than a pin-receiving area of said guide housing.

7. The storage device of claim 5, said vibration absorbing means comprising:
    deformable members positioned between respective lateral sides of said container and lateral sides of said seating area, said deformable members exerting a pressure on respective lateral sides.

* * * * *